Aug. 7, 1951     H. B. HINDIN ET AL     2,563,113
METHOD OF BONDING RUBBER TO METALS
Filed April 13, 1948     3 Sheets-Sheet 1
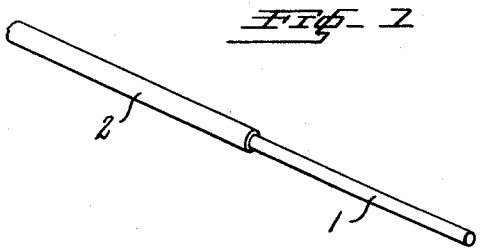
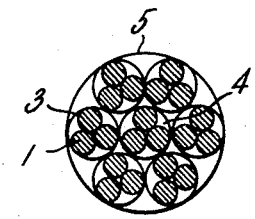
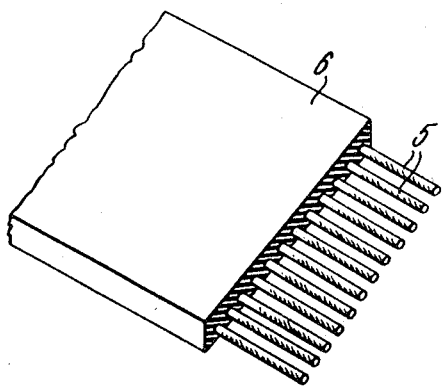
INVENTORS
HERBERT B. HINDIN
HAROLD S. HOWE
BY JAMES G. WALSH
Henry P Truesdell
ATTORNEY

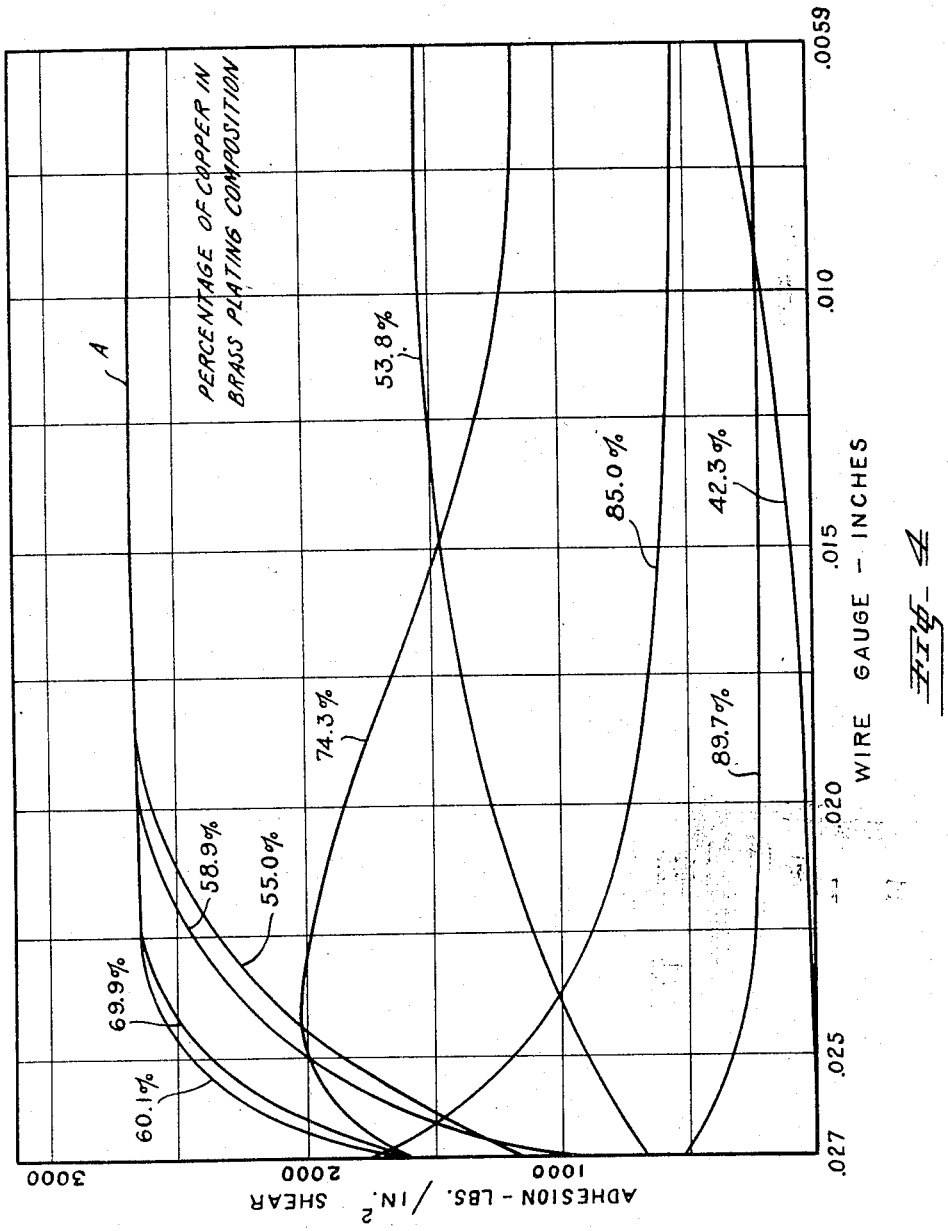

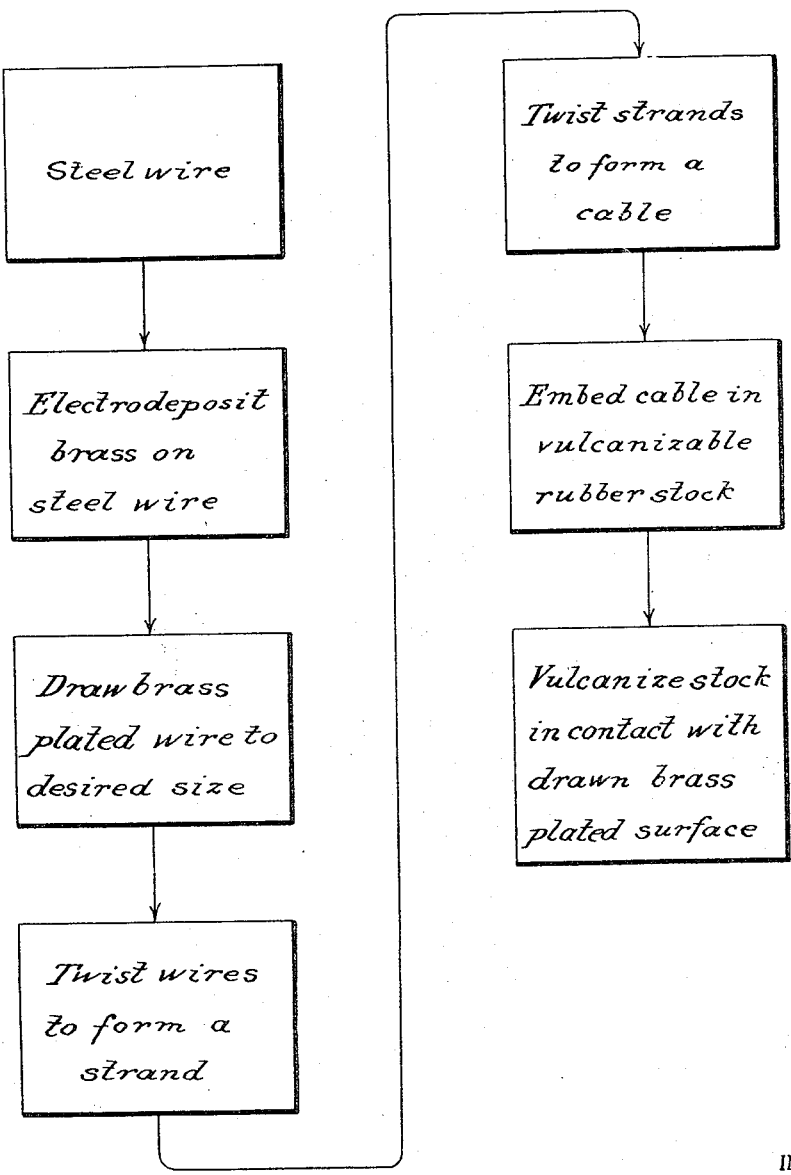

Patented Aug. 7, 1951

2,563,113

UNITED STATES PATENT OFFICE 2,563,113

METHOD OF BONDING RUBBER TO METALS

Herbert B. Hindin, Harold S. Howe, and James G. Walsh, Detroit, Mich., assignors to United States Rubber Company, New York, N. Y., a corporation of New Jersey Application April 13, 1948, Serial No. 20,736

4 Claims. (Cl. 154—130)

This invention relates to a method of bonding rubber to metal and more particularly to methods of brass plating wire and bonding rubber to the wire. Such methods include the steps of brass plating the wire, reducing the size of the brass plated wire and subsequently bonding rubber directly to the brass plated surface.

In building wire tires, it is desirable to obtain an extremely high bond between the rubber and wire making up the tire carcass. (By reference to wire herein, it is to be understood that the composition of the wire is preferably that of a high carbon steel although other grades of steel may be used as well as other materials.) A principal example of the use of such steel wire is in the manufacture of pneumatic tires in which fine steel filaments are twisted to form a cable suitable for incorporation into such a tire. When steel wire is used in the place of textile cord elements in a pneumatic tire, it is highly desirable to obtain a high bond between the rubber stock of the tire and the wire. In order to provide such adhesion, it has heretofore been customary to coat the wire with a cement, or, in some cases, to subject the twisted cable to a brass plating operation.

However, after the wires are twisted to cable form, it is difficult to coat the entire surface of each filament with brass due to the fact that the plating bath does not penetrate through the interstices of the overlapping filaments and strands of wire. As a result of such a partial plating operation, the overall adhesion is reduced and substantially no adhesion is obtained where the rubber penetrates the interstices of the cable and joins the unplated surfaces of the strands. Furthermore, since some of the filaments and strands of wire do not receive the continuous protective coating of brass, an electrolytic action results between the different metals causing corrosion of the wire.

We have found that before the steel wire is reduced to its final size, a layer of brass can be electrodeposited upon the wire and thereafter the wire drawn down to its desired size. This has several advantages. The deposit of brass on the surface of the steel filaments acts as a lubricant to facilitate the drawing operation. Furthermore, the actual working of the brass during drawing produces a surface condition whereby a considerably higher degree of adhesion with rubber can be obtained, as distinguished from brass plating without working. In other words, it has been found that rubber compositions will adhere better to brass if the brass is subjected to physical distortion or rearrangement as during a drawing operation.

In the practice of our invention, it has also been found that in drawing the wire down from a size, for example, of .028 inch to .0059 inch, that the brass coating will not pile up during the drawing operation but will flow smoothly through the die and that the thickness of the brass on the finished wire is substantially in proportion to the reduction in size of the wire itself. We have also found that it is not practical to brass plate a fine wire, such as .0059 inch in diameter, because the cost of handling a fine wire is high and it is difficult to control the deposit due to current density variation resulting from the high resistance of the wire. However, when the deposited brass is plated upon a larger diameter wire, these difficulties are substantially reduced and, therefore, the deposit is easily controlled. By subsequently reducing the diameter of a wire, the thickness of the deposited brass, is maintained within more accurate limitations.

It is understood that, heretofore, wire has been coated or plated prior to drawing it. For example, steel wire has been immersion plated with copper, although, as far as we know, wire has not heretofore been plated with brass by electrodeposition. Copper, however, is not suitable for bonding with rubber. Furthermore, brass plated wire will draw with the speed and accuracy equal or better than copper coated wire. Another advantage is that by using brass plating there is a substantial reduction in the wear of the drawing dies, and there is no appreciable breaking of the filaments during the drawing operation. Moreover, we have found that for any particular rubber stock composition, the percentage of copper relative to zinc in the brass plating may be varied to give improved adhesion between the wire and rubber.

It is, therefore, among the objects and advantages of our invention to provide a method of drawing wire; to provide a method by which rubber compositions may be bonded to brass in which the adhesion is higher than with undisturbed electrodeposited brass; to provide a method of drawing wire which can be carried out without appreciable breakage of wire and with a substantial reduction in wear of the drawing dies; to provide a method of bonding rubber to a brass plated wire which requires no additional operation for the preparation of the coated wire prior to its association with the rubber; to provide a cable formed from twisted filaments of wire in which a high degree of adhesion may be obtained between the cable and a rubber composition; to provide a cable useful for bonding rubber thereto wherein the electrochemical corrosion effect is substantially reduced; and to provide a cable, for bonding with the rubber composition, which may be manufactured efficiently and economically. These and other objects and advantages will appear more fully in the following detailed description when considered in connection with the accompanying drawings, in which:

Figure 1 is an enlarged perspective view of a portion of a brass coated steel wire of our invention;

Figure 2 is a transverse view, in section, of a cable produced by a plurality of filaments of wire;

Figure 3 is a perspective view partly in section illustrating a plurality of strands of cable imbedded in a rubber composition;

Figure 4 is a chart illustrating the strength of the bond between rubber and wire relative to the copper content of the brass and the degree of wire drawing; and, Figure 5 is a flow diagram representing the successive steps in one method of carrying out the invention.

With reference to the drawing, particularly Figure 1, we show a wire as used in the practice of our invention. The essential steps of the treatment of the wire as described hereinafter may be followed by reference to the flow diagram, Figure 5. In general, the wire identified by the reference character 1 is a high tensile, high carbon steel although other steels may be used. For the purpose of the present illustration of this invention, the diameter of this wire is .028 inch. It is to be understood, however, that the diameter of the wire is only relative and that various other wire sizes may be used with equal results.

In accordance with conventional practice the wire 1 is subjected to an acid pickling and washing operation after which it is coated with a layer of brass 2. This brass layer is preferably deposited electrically. The particular type of brass used in this plating operation is determined in accordance with the brass most suitable for bonding with the particular rubber stock. An example of such a composition is one composed of 62% copper and 38% zinc. It is to be understood, however, that this range may be varied and that good results can be obtained while maintaining the copper content within the range of 55% to 75%, depending upon the composition of the rubber stock with which it is used particularly the sulfur content of the stock.

In the electrodeposition of the wire 1 with the coating of the brass 2, we have found that an adequate deposit can be formed on the wire 1 in a period of from 10 to 35 seconds. Such a deposit is equal to a thickness of approximately .000008 inch applied to a wire of approximately .027 inch diameter. After the wire is thus plated, it is washed and coated with a solution of phosphate, lime or borax, and dried. It is then ready for the drawing operation. In drawing this composite wire, it has been found that conventional wire drawing apparatus may be used efficiently. Preferably, the die is submerged in water, and a drawing soap is used as an additional lubricant and coolant.

As the wire is drawn through the dies, its gage is reduced from .027 inch to approximately .0059 inch or less. Thirteen dies are used in this operation although the number may be increased or decreased at will in accordance with conventional drawing practice. Simultaneously with the reduction in the diameter of the steel wire, the brass coating is also reduced in thickness. It is reduced to an order of ⅕ its original thickness. During the drawing operation, the brass functions as a lubricant and passes through the die in a proportion substantially equal to the reduction in diameter of the steel wire. In other words, the brass coating does not pile up in front of the die but moves through the die to form a uniform coating on the drawn wire.

The peculiar result from drawing the brass coated wire is that during such an operation the brass is subjected to a working or physical displacement of the brass. The arrangement and shape of the molecules is believed changed and possibly a light scoring or roughening of the surface of the wire takes place. As a result of this working, the brass itself provides a higher degree of bonding with the rubber as compared with the brass plating which has not been subjected to such working. As for example of this condition, it has been demonstrated that the pull in shear indicates an adhesion strength of 2500 p. s. i. This is in the case where the brass has been worked. Under similar conditions where the plated brass has not been worked, the adhesion strength is in the order of 1200 p. s. i.

It has also been demonstrated that brass plated wire as herein described has been drawn through a die at the rate of 1500 ft. per minute. Under similar conditions it has also been demonstrated that copper coated wire, in place of the brass coated wire, would not draw satisfactorily because of excessive breakage.

An example of a cable formed of filaments of wire 1 is illustrated in Figure 2. This constitutes a 7 x 3 cable in which three filaments 1 are twisted together to form a strand 3 and six strands 3 are twisted about a center strand 4 to form the cable 5. Each of the filaments 1 of the cable 5 is brass plated and consequently the entire exposed surface of the cable, as well as all of the surfaces joining the interstices of the cable, adheres to the rubber composition during vulcanization, wherever the rubber contacts with the metal. If the brass is plated after the wire is twisted to form the cable, the plating does not penetrate the interstices of the cable. Since the rubber is applied under pressure in many cases it penetrates the interstices of the cable to a greater extent than such brass plating. Therefore, when the individual strands are plated as provided herein, the result is an increased adhesion due to a greater area capable of producing adhesion. This condition plus the fact that increased adhesion results because the brass is worked, produces a bond between the cable and the rubber composition to that high degree of adhesion which heretofore has not been obtained.

Figure 3 illustrates one form of application of the cables 5 with a rubber composition. In this illustration a plurality of wires are laid in spaced relationship and a rubber composition 6 is laid against the wires so that the wires are in effect imbedded in the rubber. Upon vulcanization, the wires become bonded firmly to the rubber composition to constitute a material which is useful in many fields. For example, the wire and rubber composition may be used as belting or it may be used in the formation of plies of a tire carcass.

By reference to rubber composition, it is to be understood that the term rubber is intended to include both natural and synthetic rubber.

The chart, as shown in Fig. 4, illustrates the adhesion of rubber to metal in pounds per inch square shear as compared with the copper content of the brass and the degree of working of the brass coating which is represented by the successive reductions in the wire diameter as the wire is subjected to the drawing operation. It will be noted that good adhesion can be obtained only when the copper content of the brass is within a specific range when the wire is being bonded to any particular stock. An example of this range is from 55% to 75%. Although on the higher copper content range of 74.3% the chart shows an ultimate drop in adhesion, it nevertheless shows a definite benefit in the early stages of the drawing operation. The curves of Figure 4 make it possible to choose a brass composition having a copper content such that maximum adhesion is obtained with the particular rubber stock after the brass coated wire has been worked and drawn down to a size for cabling into a tire cord.

Adhesion testing was accomplished by curing a ¼ inch slab of rubber with the wire imbedded therein for 30 minutes at 60 pounds steam pressure; the pull required to shear the wire from the slab was determined at a rate of pull of 10 inches per minute. This data was then computed to express adhesion as pounds per square inch as measured in shear. In the cases in which stock failure or wire breakage occurred (indicating that the adhesion was in the stock failure range), no specific points were plotted on the chart, Fig. 4. This is indicated by the line A on the chart as a maximum of approximately 2600 pounds per square inch.

As thus shown and described, it is believed apparent that we have provided a novel combination of wire and rubber composition with its resultant high bond strength therebetween, while at the same time making possible a process of drawing wire particularly applicable for its subsequent association with rubber. While we have illustrated a preferred embodiment of our invention, it is to be understood that it is susceptible of those modifications which appear obviously within the spirit of the invention and as appearing in the scope of the appended claims.

Having thus described our invention, what we claim and desire to protect by Letters Patent is:

1. In a method of bonding rubber to steel wire the steps including electrodepositing as such a layer of brass on the wire, the brass having a composition in which its copper content is in the range of 55% to 75%, reducing the size of the brass plated wire in a drawing operation, embedding the coated wire in a vulcanizable rubber composition, and vulcanizing the rubber composition in direct contact with the surface of the drawn brass plated wire.

2. The method of bonding rubber to metal comprising the steps, selecting a wire of steel having a diameter greater than the diameter ultimately required in the bonded assembly, electrodepositing as such a layer of brass containing 55 to 75% of copper on the wire, reducing the size of the brass plated wire in a drawing operation, and subsequently twisting a plurality of the coated wire filaments together to form a strand, embedding the coated strand in a vulcanizable rubber composition and vulcanizing the rubber composition in direct contact with the surface of the drawn brass plated wire.

3. The method of bonding rubber to metal comprising the steps, selecting a wire of steel having a diameter greater than the diameter ultimately required in the bonded assembly, electrodepositing as such a layer of brass containing 55 to 75% of copper on the wire, reducing the size of the brass plated wire in a drawing operation, and subsequently twisting a plurality of the wire filaments together to form a strand, twisting a plurality of the strands together to form a cable, embedding the coated cable in a vulcanizable rubber composition, and vulcanizing the rubber composition in direct contact with the surface of the drawn brass plated wire.

4. The method of bonding rubber to steel wire comprising the steps, electrodepositing as such a layer of brass containing 55 to 75% of copper on the wire, reducing the size of the wire in a drawing operation and simultaneously reducing the thickness of brass deposit on the wire, embedding the coated wire in a vulcanizable rubber composition, and vulcanizing the rubber composition in direct contact with the surface of the drawn brass plated wire.

HERBERT B. HINDIN.
HAROLD S. HOWE.
JAMES G. WALSH.

REFERENCES CITED

The following references are of record in the file of this patent:

UNITED STATES PATENTS

| Number | Name | Date |
|---|---|---|
| 1,949,623 | Quarnstrom | Mar. 6, 1934 |
| 2,323,890 | Adler | July 13, 1943 |
| 2,382,081 | Luaces et al. | Aug. 14, 1945 |
| 2,387,335 | Leonard | Oct. 23, 1945 |
| 2,438,013 | Tanner | Mar. 16, 1948 |

OTHER REFERENCES

Gurney: "Adhesion of Rubber to Brass Plate," Trans. Inst. of the Rubber Industry, September 1945, pages 31–40.